United States Patent [19]
Campbell

[11] Patent Number: 5,529,097
[45] Date of Patent: Jun. 25, 1996

[54] GAS TANK EVACUATOR

[76] Inventor: Michael C. Campbell, 1400 N. Woodhouse Rd., Virginia Beach, Va. 23454

[21] Appl. No.: 377,118
[22] Filed: Jan. 23, 1995
[51] Int. Cl.[6] .................................................. B65B 31/00
[52] U.S. Cl. ................... 141/51; 141/95; 141/98; 141/330; 222/87; 73/45; 73/49.3; 73/52
[58] Field of Search ..................... 73/49.2, 49.3, 73/45, 45.4, 52; 141/51, 95–98, 329, 330; 222/5, 81, 83, 83.5, 87

[56] References Cited

U.S. PATENT DOCUMENTS

| | | | |
|---|---|---|---|
| 3,091,958 | 6/1963 | Robins | 73/52 X |
| 3,132,508 | 5/1964 | Williams | 73/52 |
| 4,349,054 | 9/1982 | Chipman et al. | 141/330 X |
| 4,407,341 | 10/1983 | Feldt et al. | |
| 5,174,344 | 12/1992 | Gonzalez-Miller et al. | 141/51 X |
| 5,181,462 | 1/1993 | Isaac | 141/330 X |
| 5,265,762 | 11/1993 | Campbell et al. | |
| 5,271,437 | 12/1993 | O'Brien et al. | 141/51 |
| 5,284,997 | 2/1994 | Spearman et al. | 588/249 |
| 5,307,685 | 5/1994 | Bloome et al. | 73/49.2 R X |
| 5,309,956 | 5/1994 | Hajma | 141/51 X |
| 5,365,982 | 11/1994 | O'Neill | 141/51 |

FOREIGN PATENT DOCUMENTS 821399  4/1981  U.S.S.R.

Primary Examiner—J. Casimer Jacyna
Attorney, Agent, or Firm—Griffin, Butler, Whisenhunt & Kurtossy

[57] ABSTRACT

An evacuator housing (14) of a gas tank evacuator (10) receives a gas tank (12). A valve seal of a movable seal head (34) and a puncture seal (66) of the evacuator housing are clamped onto the gas tank at opposite ends by a hollow threaded shaft (32) to form a sealed test space (58) exteriorly of the gas tank at a valve (22) and a sealed evacuation space (68) exteriorly of the gas tank at a puncture spot (24). A pressure gauge (60) coupled to the test space rides on the seal head and a valve actuator in the form of a rod (40), passes through the hollow threaded shaft into the sealed test space. A puncturing mechanism (18) punctures the gas tank at the puncture spot. The sealed evacuation space is positioned vertically below the puncture spot and communicates with a carbon filter positioned vertically above the evacuation space so as to form a U-shaped trap (90).

13 Claims, 1 Drawing Sheet

GAS TANK EVACUATOR

BACKGROUND OF THE INVENTION

This invention relates generally to the art of gas cylinders, or tanks, and more specifically to methods and devices for disposing, or recycling, gas cylinders.

Deposal of hazardous waste is currently regulated by law in many developed countries. These laws attempt to control hazardous waste from "Cradle to Grave". Thus, gas tanks, or cylinders, which have been used to store propane, mapp, or oxygen gases, for example, are often classified as hazardous waste and they retain this classification until it can be clearly shown that they no longer contain hazardous waste. For this reason, waste handlers have charged large fees for disposing of substantially exhausted small propane tanks, for example. In this regard, many companies which regularly use propane gas currently pay as much as $35.00 per exhausted tank simply to dispose of them. It should be noted that although old gas tanks cannot normally be used, the material from which they are made, often steel, can be recycled. Notwithstanding this, because they still may contain hazardous waste, waste handlers charge large fees for their disposal. If users of propane tanks, and waste handlers, could readily, and visually ascertain that exhausted tanks no longer contain gas, and that it is not possible that they could hold gas, the tanks could be easily and economically deposed of and recycled as scrap metal.

U.S. patent application Ser. No. 08/213,499 of Campbell, filed on Mar. 16, 1994 discloses an apparatus which can be used for testing the contents of gas tanks and then disarming them by removing their valves. Although such an apparatus effectively disarms gas tanks of a type normally manufactured in the United States in such a manner that waste handlers can readily, and visually, ascertain that the tanks are exhausted, the apparatus described in that application cannot be used for gas tanks, or CV cartridges, commonly manufactured in Europe.

European type gas tanks normally do not have easily removable valves, thus, the earlier Campbell device described above cannot be effectively used for disarming them. The European type gas tanks are also widely sold and used in the United States.

For the above reasons, it is an object of this invention to provide a gas tank evacuator for safely evaluating contents of European type gas tanks and thereafter effectively and safely evacuating residue gases from them where desired.

Yet another object of this invention is to provide such a gas tank evacuator which takes very little strength or dexterity to operate and which is uncomplicated and relatively inexpensive in operation and structure.

It is also an object of this invention to provide a method of preparing European type gas tanks for disposal which is inexpensive but yet which effectively communicates to others the disarmed nature of such thusly prepared gas tanks.

SUMMARY OF THE INVENTION

According to principles of this invention, a gas tank evacuator has an evacuator housing for receiving a European type gas tank (whose valve is not easily removable) to be evacuated. The gas tank evacuator includes a valve seal and a puncture seal at opposite ends thereof. A clamping mechanism moves the valve seal and the puncture seal relatively toward one another to thereby clamp the gas tank between the valve seal and the puncture seal while forming a sealed test space exteriorly of the gas tank at a valve thereof and a sealed evacuation space exteriorly of the gas tank at a puncture spot thereof. A valve actuating rod extends into the sealed test space for selectively opening the valve and a pressure gauge communicates with the sealed test space for measuring the pressure in the gas tank when the valve is so opened. A puncturing pin extends through an opening in the housing for puncturing the gas tank at the puncture spot.

The clamping mechanism can be a threaded shaft mounted in the evacuator housing for moving a movable seal head which forms the valve seal. The pressure gauge is mounted on the movable seal head to move up and down therewith.

The sealed evacuation space forms a U-shaped trap.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
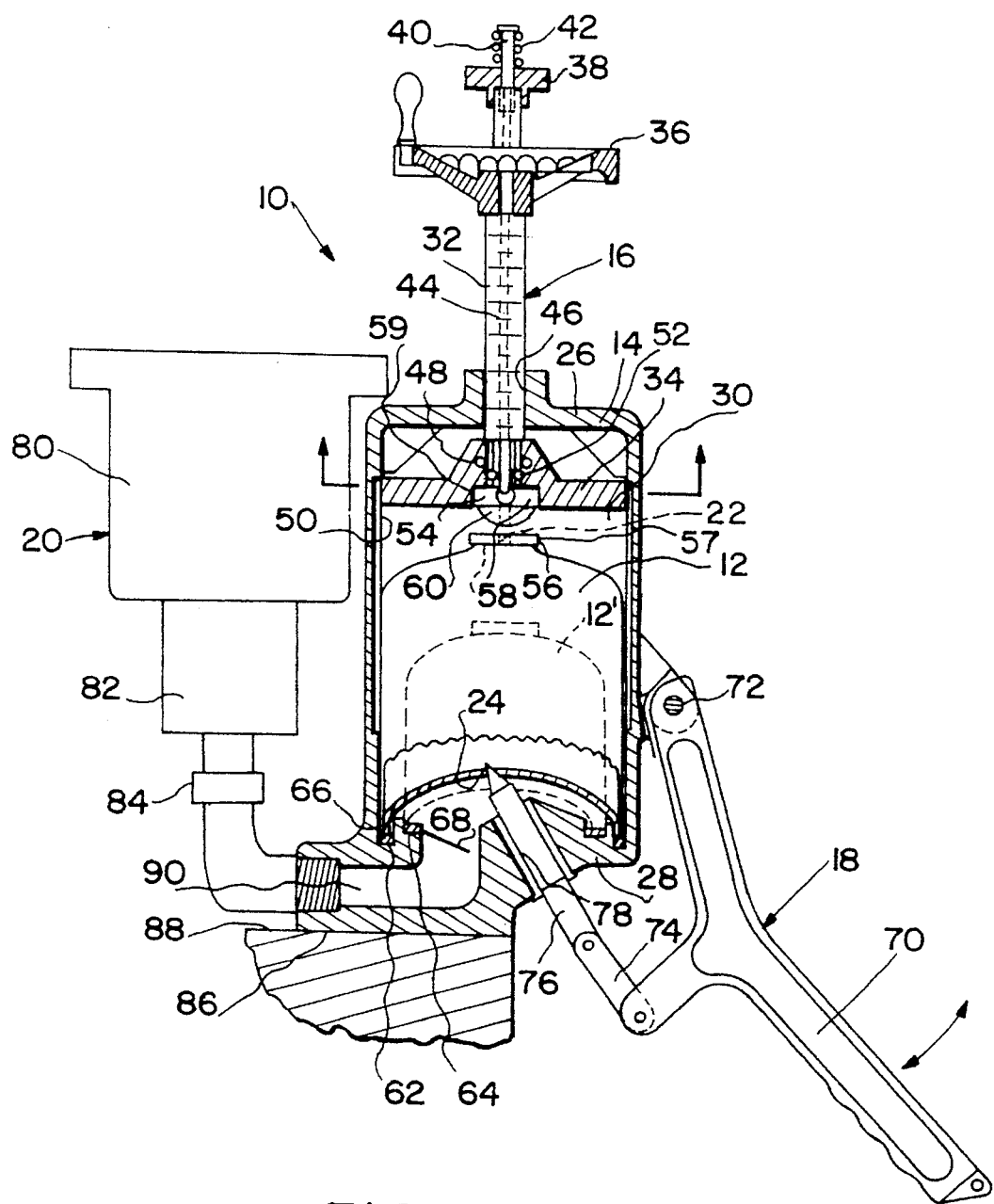
FIG. 1 is a partially cross-sectional view of a gas tank evacuator of this invention with a gas tank of a larger size shown therein in solid lines and a gas tank of a smaller size shown therein in dashed lines.

A gas tank evacuator 10 for evacuating a European type gas tank 12, 12' includes an evacuator housing 14, a clamping mechanism 16, a movable seal head 34, a puncturing-pin mechanism 18, and a filter mechanism 20. The gas tank 12 has a non-removable valve 22 at one end thereof and a puncture, or evacuation, spot 24 at a normally-indented opposite bottom end thereof.

Figure 2:
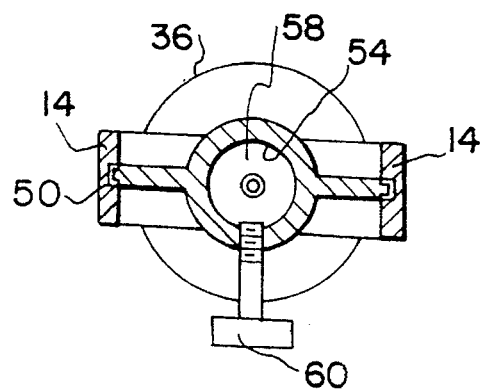
FIG. 2 is a partially cross-sectional view of a main portion of a housing of the gas tank evacuator of FIG. 1.

The evacuator housing 14 has a housing valve actuating end 26 and a housing puncturing end 28. The evacuator housing 14 defines a receiving space 30 for receiving the gas tank 12 with its valve 22 substantially directed toward the housing valve-actuating end 26 and its puncture spot 24 substantially directed toward the housing puncturing end 28. In this respect, the receiving space 30 is not enclosed on the front and back sides thereof (that is, from the direction in which FIG. 1 is viewed nor from the opposite direction) as can be seen in FIG. 2. Thus, the gas tank 12 can be inserted into the receiving space from either the front or back sides.

The clamping mechanism 16 comprises a hollow threaded shaft, or screw, 32, a rotation handle 36 affixed to the hollow threaded shaft 32 at an upper-intermediate position, a finger knob 38 also affixed to the hollow threaded shaft 32 at the upper end, and a linearly movable rod 40 mounted in a bore of the hollow threaded shaft 32 extending above the upper end and below lower end. The seal head 34 is rotatably mounted to the hollow threaded shaft 32 at a lower end thereof. The valve-actuating rod 40 is biased upwardly by a spring 42 but can be pressed downwardly by a user's thumb while he is holding his other fingers about the finger knob 38. The hollow threaded shaft 32 has low-pitch male, "ACME" threads 44 which engage female threads 46 in the evacuator housing 14 so that, when the hollow threaded shaft 32 is rotated via the rotation handle 36, it moves up and down relative to the evacuator housing 14 quite quickly to thereby move the seal head 34 up and down. In this respect, the seal head 34 is keyed to the shaft by a clip 48 which allows rotation of the seal head 34 relative to the hollow threaded shaft 32, but which does not allow linear movement of the seal head 34 along the shaft 32. Thus, as the hollow threaded shaft 32 is rotated to move the seal head 34 up and down, the seal head itself does not rotate but rather is engaged in a groove 50 in the evacuator housing 14. However, a lower end of the hollow threaded shaft 32 is sealed with the seal head 34 by means of an O-ring 52 so that fluid cannot escape between these two members.

The seal head 34 defines a head cavity 54 on a bottom surface thereof which receives a neck 56 of the gas tank 12 surrounding the non-removable valve 22. When the hollow threaded shaft 32 is screwed into the evacuator housing 14, to thereby clamp a side surface 57 of the neck 56 against side surfaces 59 in the head cavity 54, the neck 56 forms a seal with the head 54 about the non-removable valve 22. This creates a sealed test space 58 exteriorly of the gas tank at the valve 22.

A pressure gauge 60 is screwed into a sidewall of the seal head 34 so as to communicate with the head cavity 54 and also to communicate with the sealed test space 58 when the seal head 34 is clamped onto the neck 56 by rotation of the hollow threaded shaft 32.

The evacuator housing 14 has two upwardly-facing, floor, annular seals 62 and 64 at the bottom of the receiving space 30. As can be seen in FIG. 1, the annular seal 62 is larger than the annular seal 64 and is, therefore, for larger gas tanks. By having a plurality of different size seals, the gas tank evacuator 10 can be used with various size gas tanks. Each of these seals 62, 64, forms a complete ring for contacting a lower edge 66 of the gas tank 12, 12' and forming a sealed interface therewith about the puncture spot 24 to, in turn, create a sealed evacuation space 68 exteriorly of the gas tank at the puncture spot 24.

The puncturing-pin mechanism 18 includes a lever 70 which is pivotally attached to the evacuator housing 14 at a pivot 72, a pivot-link 74 and a puncturing pin 76 which slidably, but sealingly, extends through an opening, or aperture, 78 in the housing puncturing end 28 of the evacuator housing 14.

The filter mechanism 20 includes an activated-carbon filter 80 which is coupled via an adaptor 82 and a check valve 84 with the sealed evacuation space 68.

The housing puncturing end 28 of the evacuator housing 14 has a mounting surface 86 which can be mounted on a horizontal support surface 88 so that the sealed evacuation space 68 is located below the puncture spot 24 and so that the activated-carbon filter 80 and the check valve 84 are located above the lowest portion of the sealed evacuation space. That is, in order for gas to exit from the sealed evacuation space, it must move vertically upwardly.

The puncturing-pin mechanism 18 is quite similar to a puncturing-pin mechanism disclosed and described in U.S. Pat. No. 5,265,762 to Campbell et al. and that disclosure is incorporate by reference herein. Similarly, the filter mechanism 20 is quite similar to a filter mechanism disclosed in U.S. patent application Ser. No. 08/213,499, filed on Mar. 16, 1994 by Michael C. Campbell and that description of a filter mechanism is incorporated herein by reference.

The gas tank evacuator 10 of this invention operates as follows: The evacuator housing is mounted on a horizontal support 88 so that the housing valve-actuating end 26 is directed vertically upward as is the filter mechanism 20. In this mounting position, the sealed evacuation space 68 is located below the puncture spot 24 and extends below the check valve 84 and the carbon filter 80 to form a U-shaped trap 90.

The hollow threaded shaft 32 is rotated by means of the rotatable handle 36 so as to raise the seal head 34 and the lever is held in a raised position (not as shown in FIG. 1) by a biasing spring (not shown). In this configuration, the puncturing pin 76 and the seal head 34 are substantially clear of the receiving space 30 so that the gas tank 12 can be inserted into the receiving space 30 with an external surface of its lower edge 66 contacting the annular seal 62. Once the gas tank 12 is in this position, the hollow threaded shaft 32 is rotated via the rotation handle 36 to move the seal head downwardly, thereby clamping the neck 56 of the gas tank 26 in the head cavity 54 and clamping the lower edge 66 of the gas tank 12 against the annular seal 62. The gas tank 12 is thereby sealed at opposite ends so as to form the sealed test space 58 exteriorly of the gas tank at the valve 22 and the sealed evacuation space 68 exteriorly of the gas tank at the puncture spot 24. Once the gas tank 12 is thusly clamped by the clamping mechanism 16, an operator depresses the valve-actuating rod 40 with his thumb, while wrapping his fingers about the finger knob 38. The valve-actuating rod 40 operates the valve 22 thereby release gas from the gas tank 12 into the sealed test space 58 where it communicates with the pressure gauge 60. The operator then reads the pressure gauge 60 and determines if the gas tank 12 should be evacuated and recycled.

If it is determined that there is sufficient pressure in the gas tank 12 that the gas tank should not be recycled, the hollow threaded shaft 32 is rotated to release the gas tank 12 and it is further used. However, if it is determined that the gas tank 12 is substantially empty and that it should be recycled, the lever 70 is pressed downwardly, thereby driving the puncturing pin 76 through the sealed evacuating space 68 into the gas tank 12 at the puncture spot 24. Liquid gas, gas and vapor are immediately forced through the hole at the puncture spot 24 by pressure in the gas tank 12 and these liquids, gases and vapors pass into the sealed evacuation space 68 forming the U-shaped trap 90. Eventually, these materials create a pressure below the check valve 84 which only allows upward flow of gases therethrough at 3 lbs./inch$^2$ above atmosphere. The gases flow through the activated carbon filter 20 and are thereby cleaned to be released into atmosphere.

It is beneficial that the clamping mechanism 16 clamps opposite annularly seals on the exterior of the gas tank to simultaneously form the sealed test space exteriorly of the gas tank at the valve and the sealed evacuation space exteriorly of the gas tank at the puncture spot.

Further, it is beneficial that the pressure gauge is mounted on the linearly-movable, but rotatably non-movable, seal head 34 because in this manner, it can easily communicate and cooperate with the sealed test space, while remaining in a position to be read by a user.

Similarly, it is advantageous that the valve actuating rod 40 is mounted on the hollow threaded shaft 32 which moves the seal head 34 because in this manner, the valve-actuating rod can always enter the sealed test space for actuating gas tank valves and moves relative to the gas tank along with the valve sealing mechanism.

It is beneficial to have the sealed evacuation space form a vertical U-shaped trap for receiving gas-tank residue released vertically downwardly thereinto while releasing gases therefrom vertically upwardly because in this manner liquids are not caused to pass through the carbon filter to possibly damage the carbon filter. Instead, only gases are passed through the carbon filter.

Similarly, it is beneficial to include the check valve 84 downstream of the trap 90 and upstream of the carbon filter 80 to also ensure that no liquids pass through the carbon filter 80.

While the invention has been particularly shown and described with reference to a preferred embodiment, it will be understood by those of ordinary skill in the art that various changes in form and detail may be made therein without departing from the spirit and scope of the invention. For example, the gas tank evacuator could be supported in ways other than as shown in FIG. 1. Also, in a preferred embodiment the gauge 60 is actually mounted on the opposite side of the seal head 34 than that shown in FIG. 1, so as to extend toward the viewer. However, it is shown in FIG. 1 as extending away from the viewer so that other features can be seen in FIG. 1.

Further, clamping mechanisms other than a threaded shaft could be used in this invention, such a system of levers. Also, it would be possible to hold the seal head 34 stationary and move the annular seal 62.

It should be recognized that the device of this invention functions substantially the same for different size gas tanks.

Still further, the U-shaped, trap, evacuator space of this invention could also be used in an evacuator system that opens a valve, as opposed to one which punctures. It could also be used in a system that does not first measure pressure.

The embodiments of the invention in which an exclusive property or privilege are claimed are defined as follows:

1. A gas tank evacuator for evacuating a gas tank of a type having a valve at one end and a puncture spot at an opposite end thereof said gas tank evacuator comprising:
    an evacuator housing having a housing valve-actuating end and a housing puncturing end, said evacuator housing defining a receiving space for receiving a gas tank with its valve directed substantially toward the housing valve-actuating end and its puncturing spot directed substantially toward said housing puncturing end;
    valve sealing means positioned at said housing valve-actuating end for engaging an outer surface of said gas tank about said valve and thereby forming a sealed test space exteriorly of said gas tank at said valve;
    valve actuating means engaging said valve sealing means for selectively extending into the sealed test space, engaging the valve of the gas tank, and thereby opening the valve;
    pressure gauge coupled to said valve sealing means for communicating with said sealed test space to measure the pressure in said gas tank when said valve sealing means forms said sealed test space and said valve actuating means opens said valve;
    puncture sealing means mounted on said evacuator housing at housing puncturing end for engaging an outer surface of said gas tank about said puncture spot and thereby forming a sealed evacuation space exteriorly of said gas tank at said puncture spot;
    a puncturing means for selectively puncturing said gas tank at said puncture spot when said sealed evacuation space is formed; and
    clamping means linked to one of said puncture sealing means and said valve sealing means for moving said puncture sealing means and said valve sealing means relatively toward one another for thereby clamping said gas tank between said valve sealing means and said puncture sealing means to create said seal test space and said sealed evacuating space.

2. A gas tank evacuator as in claim 1 wherein said valve sealing means comprises a movable seal head movably mounted on said evacuator housing by said clamping means.

3. A gas tank evacuator as in claim 2 wherein said pressure gauge is also mounted on said movable seal head to move therewith.

4. A gas tank evacuator as in claim 3 wherein said clamping means is a threaded shaft which threadingly engages said evacuator housing and wherein said movable seal head is rotatably mounted on an end of said threaded shaft with said seal head engaging said evacuator housing so as not to rotate with said threaded shaft but to move linearly with said threaded shaft.

5. A gas tank evacuator as in claim 4 wherein said valve actuating means is a rod which passes through said threaded shaft for extending into said sealed test space.

6. A gas tank evacuator as in claim 5 wherein said evacuator housing has an aperture at said puncturing end for extending into said sealed evacuation space and wherein said puncturing means is a pin movably mounted on said evacuator housing for extending through said aperture and piercing said gas tank at said puncturing spot.

7. A gas tank evacuator as in claim 2 wherein said clamping means is a threaded shaft which threadingly engages said evacuator housing and wherein said movable seal head is rotatably mounted on an end of said threaded shaft with said seal head engaging said evacuator housing so as not to rotate with said threaded shaft but to move linearly with said threaded shaft.

8. A gas tank evacuator as in claim 7 wherein said valve actuating means is a rod which passes through said threaded shaft for extending into said sealed test space.

9. A gas tank evacuator as in claim 1 wherein said evacuator housing includes a mounting means for mounting said evacuator housing with the housing valve-actuating end directed vertically upwardly and said sealed evacuator space positioned vertically below said puncture spot.

10. A gas tank evacuator as in claim 9 wherein there is further included a carbon filter coupled to said sealed evacuator space and located vertically above said sealed evacuator space.

11. A gas tank evacuator as in claim 10 wherein there is a check valve coupled in a line between said carbon filter and said sealed evacuator space.

12. A gas tank evacuator for evacuating a gas tank of a type having a valve and a puncture spot, said gas tank evacuator comprising:
    an evacuator housing, said evacuator housing defining a receiving space for receiving a gas tank;
    a valve sealing means mounted on said evacuator housing for engaging an outer surface of said gas tank about said valve and thereby forming a sealed gas space exteriorly of said gas tank at said valve;
    valve actuating means engaging said valve sealing means for selectively extending into the sealed test space engaging the valve of the gas tank, and thereby opening the valve;

a pressure gauge coupled to said valve sealing means for communicating with said sealed test space to measure the pressure in said gas tank when said valve sealing means forms said sealed test space and said valve actuating means opens said valve;

a puncturing means for puncturing said gas tank;

clamping means coupled between said valve sealing means and said evacuator housing for moving said valve sealing means toward said gas tank in said receiving space for thereby clamping said valve sealing means on the outer surface of said gas tank about said valve and thereby forming said sealed test space exteriorly of said gas tank at said valve;

whereby said valve sealing means comprises a movable seal head movably mounted on said evacuator housing by said clamping means with the gas tank being held stationary relative to the evacuator housing.

13. A gas tank evacuator as in claim 12 wherein a pressure gauge is also mounted on the movable seal head to move toward and away from the gas tank with the seal head.

* * * * *